June 30, 1964   R. D. JOHNSON   3,139,286
TANK TRUCK HOPPER BODY FORMED WITH ARCUATE SURFACES
Filed Nov. 13, 1961   3 Sheets-Sheet 1
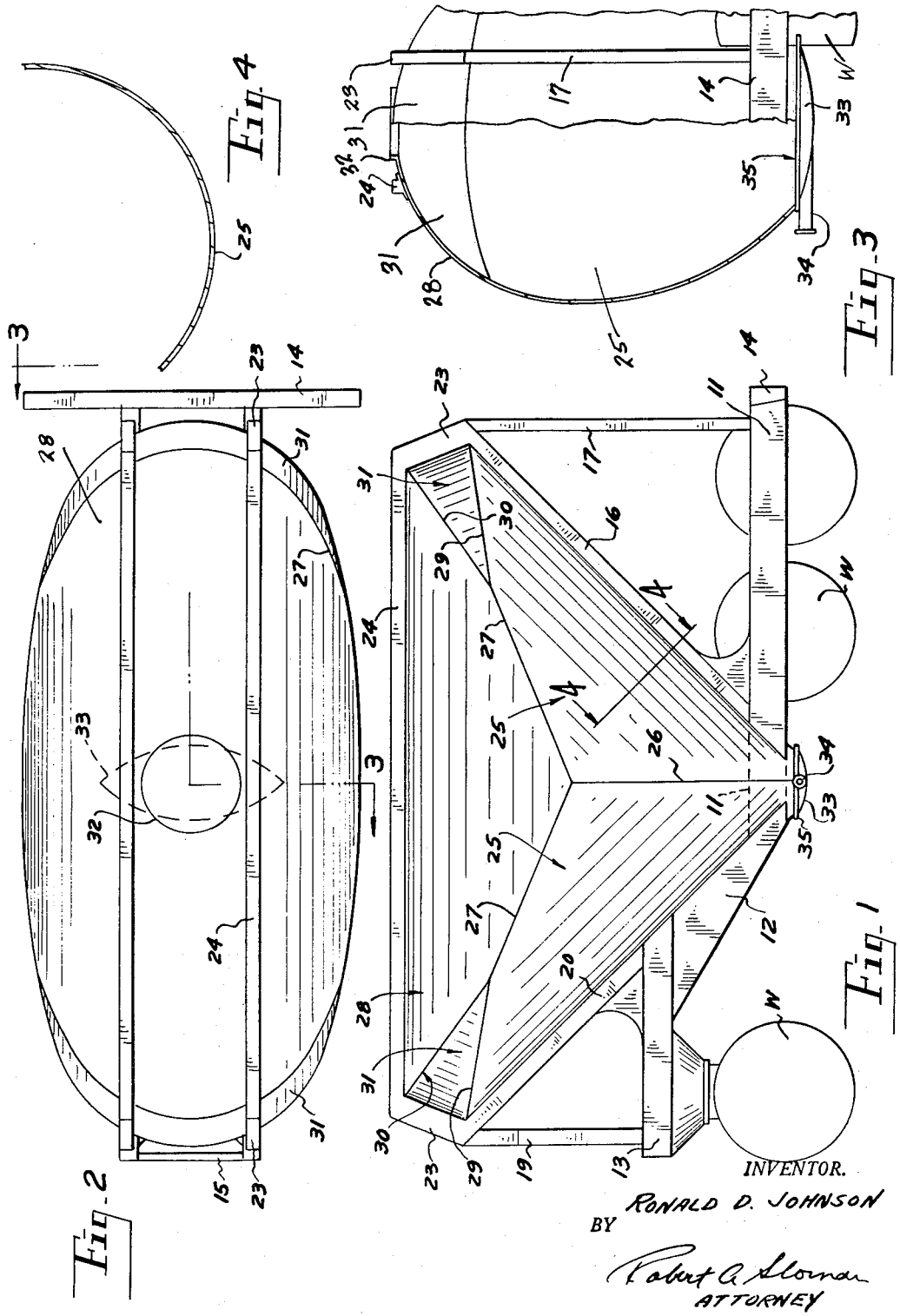
INVENTOR.
RONALD D. JOHNSON
BY
Robert A. Sloman
ATTORNEY

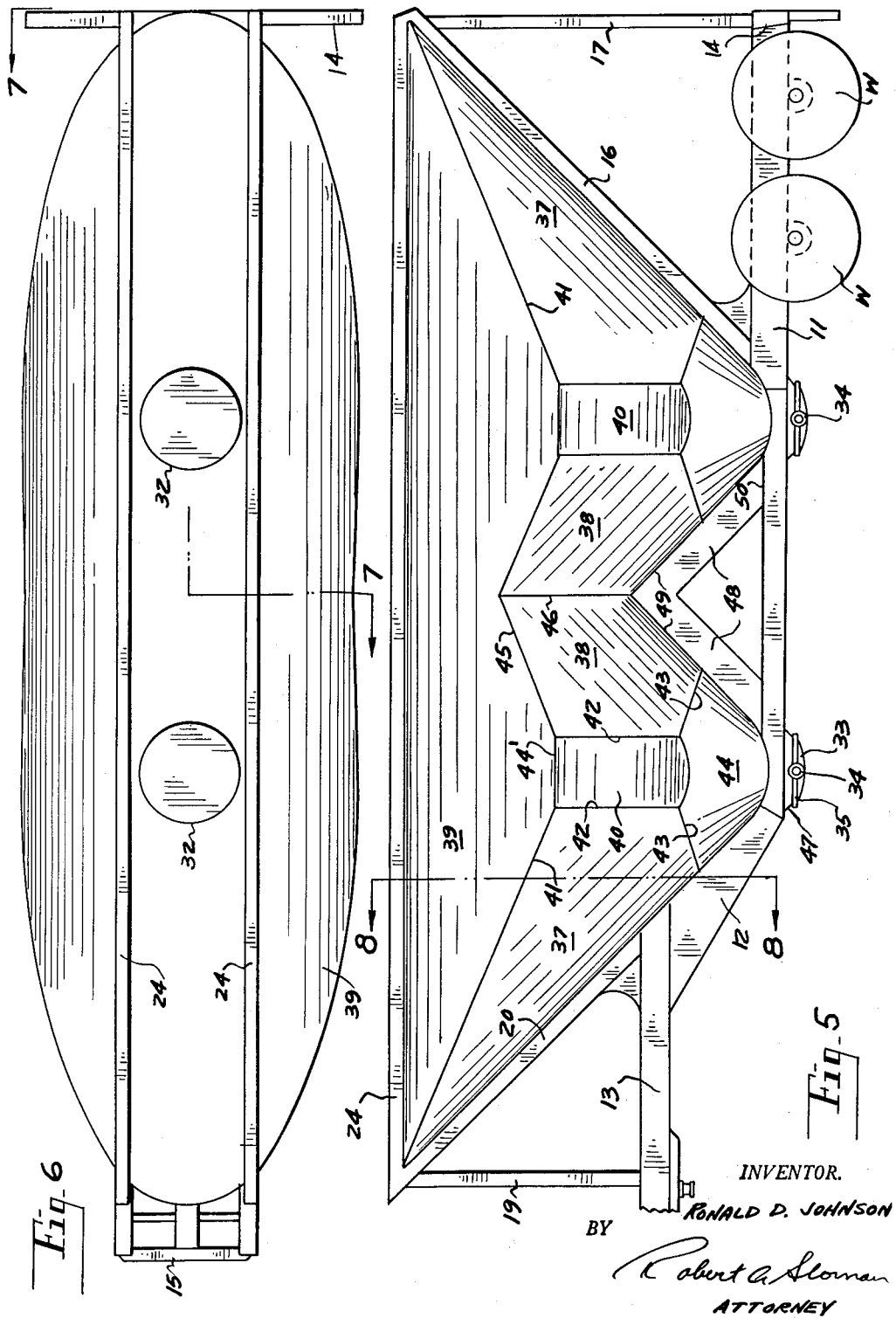

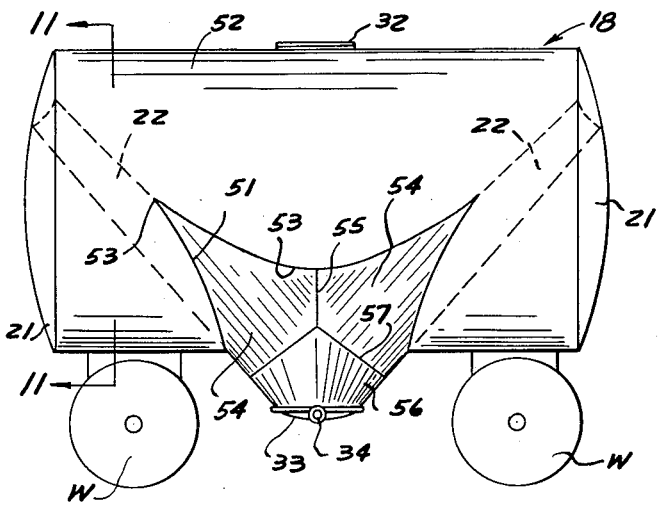
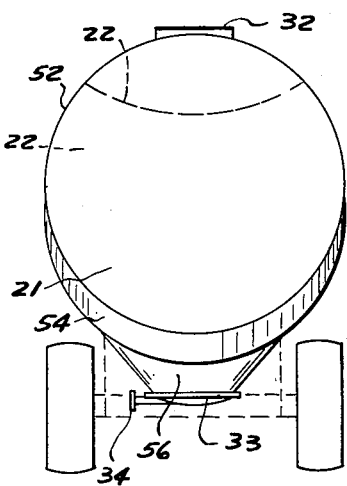
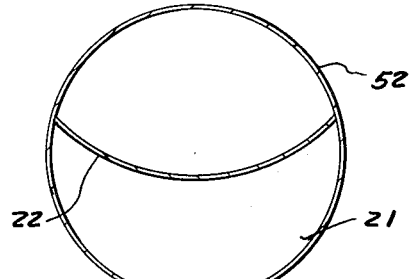
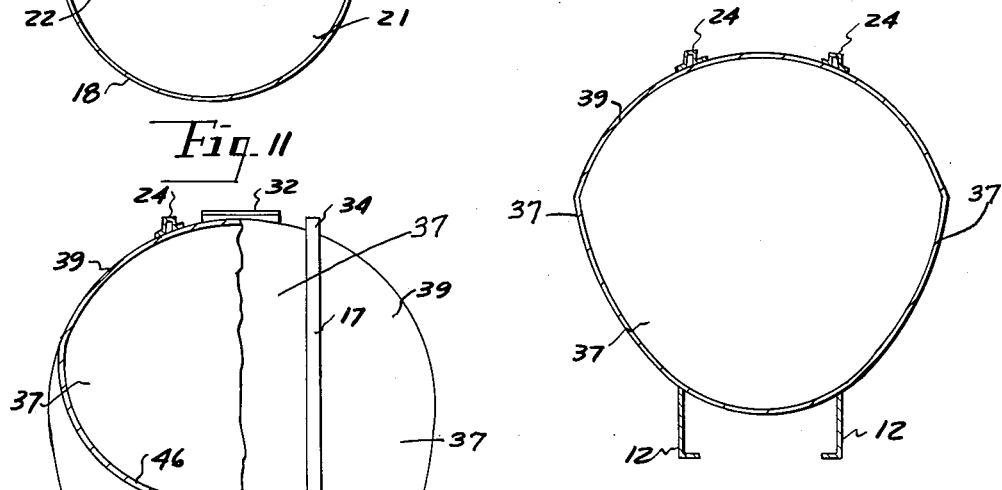
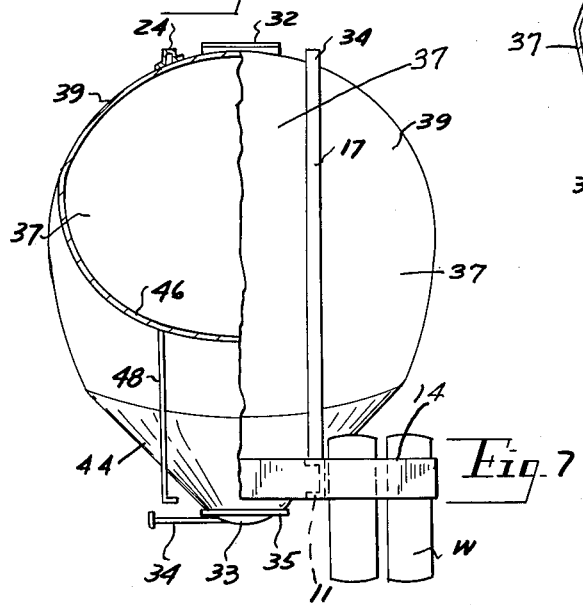

_United States Patent Office_  3,139,286
Patented June 30, 1964

3,139,286
TANK TRUCK HOPPER BODY FORMED WITH ARCUATE SURFACES
Ronald D. Johnson, Oak Park, Mich.
(5944 Casmere, Detroit 12, Mich.)
Filed Nov. 13, 1961, Ser. No. 152,380
8 Claims. (Cl. 280—5)

This invention relates to a tank truck, more particularly to a tank truck including a tank body which is characterized in the formation of the enclosing walls thereof by the intersection and interconnection of a series of arcuate surfaces of general cylindrical form.

It is an object of this invention to provide in a tank truck body of common form a novel hopper construction, defined by a pair of downwardly and inwardly inclined opposing walls of transversely arcuate section.

It is the object of the present invention to provide a novel form of tank body for a tank truck wherein the end and side wall portions of the said body are defined by a pair of downwardly and inwardly inclined opposing walls as sectors of cylindrical forms.

It is another object of this invention to provide in said tank body a longitudinally extending downwardly facing top wall which likewise forms a sector of a cylindrical form and is so cut throughout its periphery as to register with and be secured to corresponding upper peripheral edge portions of the said inwardly inclined opposing walls.

It is an object of the present invention to provide a closed tank body for a tank truck wherein the bounding walls thereof are formed as irregular sectors which form a part of generally cylindrical forms of substantially corresponding radii.

It is a further object of the present invention to provide a closed tank body for a tank truck wherein the end and side wall portions thereof are defined by a pair of downwardly and inwardly inclined opposing walls which are transversely arcuate and of a general cylindrical shape and wherein the lower portions thereof intersect and are secured together in vertical planes.

The past practice of pressure tank trucks, carrying solid bulk products, has been to convey the product to the point of pneumatic unloading by an auger, or an airslide. Or there would be used a cylindrical unit with one or more series of heavy flat surface plates to direct the product downwardly in the hopper portion of the trailer. Or there would be used a vertical cylinder and cone arrangement for its obvious pressure hopper qualities, or a horizontal cylinder, and cone arrangement at one end. By lifting the opposite end of the cylinder like a dump truck till it reached the correct angle of repose, the product would fall free to the cone and to the point of pneumatic unloading.

These practices were accepted as public knowledge. The present invention is to a stationary sloping transversely curved directing sheet on a tank so as to achieve a pressure tank truck construction that is lighter in weight than any other built to the time of this invention.

The main object is to provide a transversely curved slope sheet at the necessary angle of inclination to direct the free falling product toward the unloading point. Thus lighter gage metals may be employed due to the curved surfaces that distribute better the stresses due to internal forces.

It is another object of the present invention to provide a closed tank body for a tank truck which consists of at least a pair of longitudinally extending interiorly interconnected hopper bodies and wherein each hopper body is defined at its sides and ends by a pair of downwardly and inwardly inclined wall portions which are transversely arcuate and of general cylindrical form in part and wherein there is provided as a top wall for the said hoppers, a longitudinally extending transversely arcuate top wall portion which is of general elliptical shape in plan and whose peripheral edges are cut in such a manner as to cooperatively register with and be secured to corresponding upper edge portions of the adjacent downwardly and inwardly inclined walls.

These and other objects will be seen from the following specification and claims in conjunction with the appended drawings in which:

FIG. 1 is a fragmentary side elevational view of a tank truck embodying the present invention.

FIG. 2 is a plan view thereof.

FIG. 3 is a fragmentary section taken on line 3—3 of FIG. 2.

FIG. 4 is a fragmentary projected section based on FIG. 1 showing the cross sectional shape of the downwardly and inwardly inclined wall portion of the tank truck viewed in the direction of the longitudinal axis thereof.

FIG. 5 is a fragmentary side elevational view of a tank truck including a closed tank body and including a pair of longitudinally aligned and interconnected hoppers.

FIG. 6 is a fragmentary plan view thereof.

FIG. 7 is a fragmentary section taken on line 7—7 of FIG. 6.

FIG. 8 is a fragmentary section taken on line 8—8 of FIG. 5.

FIG. 9 is a fragmentary side elevation of a different form of hopper construction for a tank truck.

FIG. 10 is an end view thereof.

FIG. 11 is a fragmentary section taken on line 11—11 of FIG. 9.

It will be understood that the above drawings illustrate merely preferred embodiments of the invention and that other embodiments are contemplated within the scope of the claims hereinafter set forth.

Referring to the drawings, one form of the present tank truck is shown in FIGS. 1 through 4 and includes a supporting framework on wheels comprising the opposed pairs of longitudinally extending channel members 11, the inclined side frame elements 12 fixedly secured thereto and terminating at their upper end portions in the forwardly extending opposed side frame elements 13, preferably of a channel form in cross section.

The side frame elements 11, 12 and 13 are respectively interconnected at their opposite ends by the cross pieces 14 and 15 which are suitably secured thereto as by welding, for illustration.

The present hollow framework also includes upon opposite sides thereof the opposed spaced pairs of inclined channels 16 and upright square tubes 17 at the one ends of the side frame portions, and with additional inclined channels 20 and upright square tubes 19 on opposite sides of the framework at the other ends thereof. Each of these elements is suitably interconnected with each other and with portions of the main framework by welding, for illustration, to provide a rigid assembly.

The respective side frames also include on opposite sides and at the ends thereof the upwardly inclined channel elements 23, best shown in FIG. 1, which terminate in the longitudinal parallel spaced top channels 24, all suitably welded together to provide a rigid unit.

The above described supporting framework for the tank truck is mounted upon wheels in a conventional manner which wheels are generally designated by the letter W.

The primary invention herein is directed to a closed tank body which is mounted upon and within the above described framework and which includes as best shown in FIG. 1, a pair of downwardly and inwardly inclined opposing walls 25, which are transversely arcuate and are actually formed as sectors of cylindrical forms.

Lower end edge portions of the said inclined walls are cut in a vertical plane as at 26 and fixedly interconnected as by welding for illustration to define the end walls and side wall portions of the tank body.

There is also provided a longitudinally extending downwardly facing top wall element 28, which is transversely arcuate and forms the sector of a cylindrical form and wherein its peripheral edge 27 is cut and formed in a general shape of an ellipse in plan as shown in FIG. 2, and is peripherally secured to upper edge portions of the said inclined walls 25 to thus define the top and side wall portions of the tank.

In the illustrative embodiment shown in FIGS. 1 and 2, upper edge portions of the inclined walls 25 are cut away at 29 and end edge portions of the top wall element 28 are cut away as at 30 and there is interposed between said cut away edges the end wall sections 31 at the opposite ends of the body, which register with the adjacent end wall portions and side wall portions of the top and are suitably secured thereto along their connecting edges along the lines 29 and 30 completing the enclosure of the tank body.

In the illustrative form of the present invention, the said closed tank body is nested within the hollow above described framework and all contacting edge portions thereof are fixedly secured to the said framework as by welding for illustration, to thus provide a rigid assembly and wherein the said closed tank body is fixedly and immovably secured within the said framework.

A conventional type of closure 32 is arranged over a central opening in the top wall element 28. There is also provided adjacent the converging lower ends of the end walls 25, the central portion of the tank body, the bottom outlet portion 33, the elliptical shape of which is shown in FIG. 2 and to which all the granular or other material stored within the tank body movably projects for removal through the outlet pipe 34 which projects from the bottom of the closure member 33.

Normally an aeration means is employed by which the interior of the tank is pressurized for the pressure delivery of the materials through the outlet pipe 34.

This structure forms no part of the present invention and accordingly further detail is omitted. It is noted, however, particularly in FIG. 3 that there is a connecting flange at 35 which interconnects bottom wall or outlet portion 33 of the tank with the main body of the tank defined by the downwardly extending interconnected arcuate end walls 25 to thus complete the construction of the closed tank assembly.

Accordingly, it is seen from the foregoing description that side wall portions and top wall portions of the tank body are defined by members which are of a general cylindrical form for maximum strength and maximum volume and wherein the peripheral or meeting edge portions of the respective elements are fixedly interconnected thereto as by continuous welding for illustration to provide the closed tank body shown.

As shown in FIG. 1, the lower edge portions of the inclined walls 25 are cut throughout an arc of approximately 180 degrees to thus define the bottom portions of the closed tank body. It is noted from FIGS. 1 and 2, that the upper edge portions of the end walls 25 are formed as opposed substantially continuous curves, which are high at their central portions and incline downwardly and inwardly towards their ends, the top wall being similarly formed to provide the construction shown in FIG. 1, for example.

A slightly different form of the invention is shown in FIGS. 5, 6, and 7, wherein the tank truck includes a hollow supporting framework on wheels indicated at W, being of the trailer type of construction, as noted by the fifth wheel formation at the forward end of the framework and wherein the closed tank body is in the nature of a pair of longitudinally aligned intercommunicating hoppers which are nested down within a hollow framework and fixedly secured thereto.

The method of securing, as above described in connection with FIGS. 1 and 2 is exactly the same in the sense that the wall portions which define the tank body shown in FIG. 5 are secured to all engaging portions of the framework by a series of welds to thus from a rigid and unit assembly.

The primary invention, however, is directed to the formation of the hopper elements which make up the tank body.

To the extent that the framework for the tank truck, shown in FIG. 5 corresponds to the framework shown in FIG. 1, similar numerals are employed to designate common elements whose description is not repeated. In other words, the said hollow framework shown in FIG. 5 includes a pair of upright frames which include the bottom channels 11, 12 and 13, all interconnected and the upright opposed pairs of additional frame elements 19 and 20 at the forward and of the truck body and the elements 17 and 16, rear end portions thereof.

This framework also includes parallel spaced top channels 24, which extend throughout the length of the framework and at their respective ends are joined to the corresponding side frame members 16 and 17 and 19 and 20, where they intersect. The structure is an all-welded framework, the same as above described in connection with FIGS. 1 and 2, and wherein all the intersecting wall portions are fixedly secured thereto as by a continuous seam-type of welding, as hereafter described.

Each of the pair of longitudinally aligned hoppers includes a pair of downwardly and inwardly inclined opposing walls 37 and 38 respectively, which correspond in shape to a sector of a cylindrical form. Their opposing inner edges are cut in vertical planes as indicated at 42 in FIG. 5 and in this case are interconnected by the intermediate substantially upright transversely curved plate 40, which is welded at all contacting portions, including top, bottom and side portion, as shown, to adjacent parts of the tank body.

The tank body also includes, as a cover for the longitudinally aligned pair of hoppers, a longitudinally extending downwardly facing top wall element 39, which is also in the form of a sector of a cylinder, being transversely arcuate, as shown in FIG. 7, and wherein the peripheral edges in plan define substantially an elliptical form, as best shown in FIG. 6.

The said peripheral edges are cut throughout 360 degrees, as best shown in FIG. 5, high at the respective upper end portions and with intermediate portions extending downwardly for cooperative registry at the meeting edges with corresponding end wall portions 37 and 38 as at the lines of contact 41, 44', and 45, shown in FIG. 5 wherein they are welded together by a continuous form of seam welding to provide a continuous closed tank body.

It is noted in the formation of an assembly of the two upright hoppers that actually the inner converging wall portions 38 thereof intersect at points short of the upper end portions of the outer arcuate walls 37, as along the vertical plane, indicated at 46 wherein the parts are suitably secured together and welded. The remainder of the inner arcuate side and end wall portions 38 of the respective hopper elements are cut away to provide communication between the interiors of the respective hopper assemblies. It is noted in this connection that the arcuate end walls 37 of the respective hoppers extend upwardly to a point which is substantially beyond points where the respective opposite sides of the connecting walls 38 extend. It is noted in this connection, also, that the end walls 37 extend outwardly until they intersect the respective end portions of the top wall 39 adjacent its arcuately formed ends, as best shown in FIG. 5.

Primarily here just as in FIG. 1, the respective walls define the hollow tank body, or in turn the respective interconnected hoppers, forming the tank body, consist of curved wall elements such as the elements 37, 38 and 39, which if continued in form would form the wall portions or sectors of cylinders.

In view of the irregular formation of the corresponding inwardly extending end wall portions 37 and 38, it is seen that the top wall 39 must be irregularly formed for registry therewith, as indicated at the points 41, 44′, and 45 of FIG. 5. The formation is slightly different than that shown in FIG. 1, in the sense that the bottom portions of the downwardly and inwardly inclined end walls 37 and 38 of each of the hopper constructions are cut away in a general horizontal plane along the lines 43, and a hollow conically shaped bottom plate 44, shaped to conform with the said inclined walls is nested thereunder at its edges and peripherally secured thereto throughout 360 degrees along the same meeting edges 43 to complete the respective bottom portions or outlet portions of the respective hoppers.

The lower ends of the bottom plates 44 terminate in the conically formed outlet portions 47, to which is connected as by the flange 35 an outlet assembly 33, which includes the outlet pipe 34 which extends laterally thereof, the same as the construction above described with respect to FIGS. 1 and 3, and which is also shown in FIG. 7, completing the tank body structure. The meeting and interconnecting arcuate edge portions 46 lying in vertical plane, shown in FIG. 5, are further illustrated in cross sectional form in FIG. 7 to show the communication between the interiors of the respective interconnected hopper elements, which are mounted and secured within the framework of the tank truck.

Additional reinforcing beam elements are arranged as part of the hollow framework to supportably engage opposite side wall portions of the respective hopper elements as at 48, being secured thereto at contacting wall portions as at 49, and with the lower ends thereof engaging the framework channels 11 and secured thereto as at points 50 to best provide an intermediate supporting framework for the inner adjacent portions of the respective hoppers.

One of the primary advantages of incorporating the cylindrical shapes into the wall members is that there is provided a maximum strength of material for a unit area with the result that increased internal pressures may be provided upon the interior of the tank, such as are used in dispensing the material stored therein through the respective outlets 34.

The cylindrical form also provides for a maximum surface length and breadth in defining the walls of the tank body so as to sustain internal pressures up to approximately 15 to 20 pounds per square inch, for illustration, though not by way of limitation. At the same time, the cylindrical shape provided permits of a maximum internal storage volume for a given area of tank body wall.

It is contemplated that any transversely arcuate shape of plate could be used instead of a cylindrical form. Such form described in the foregoing specification is merely illustrative of only one form of the transversely arcuate shape. The arcuate form may have a single radius or several radii.

A slightly different form of the present hopper tank truck is shown in FIGS. 9, 10 and 11. Here the body, generally indicated at 18 is of a cylindrical form with convex opposite ends 21 of a conventional construction. A hopper assembly is provided within the body defined by a pair of downwardly and inwardly inclined opposing transversely arcuate walls 22, best shown in FIGS. 9 and 10, which are so cut as to cooperatively register with corresponding edge portions 53 of the downwardly facing top wall element 52, and are secured thereto as by welding.

The transversely arcuate plates 54 extend across and are suitably secured to adjacent edge portions 51 of the walls 22, as shown in FIG. 9. Their outer edge portions in the preferred embodiment register in a vertical plane and are suitably secured thereto by welding along the line 55. There is a generally concave bottom wall portion 56 which is so cut as at 57 for cooperative registry with corresponding lower edge portions of plates 54 to thus complete the base of the hopper construction.

Comparison of FIG. 9 with FIGS. 1 and 5 will make it apparent that the supporting framework for the walls 22—22 and the hopper 56 constitutes that part of the body 18 and those portions of the bulkheads 21—21 below the walls 22—22. This support is therefore accomplished in much the same manner as in the frame portions 16–17 and 19–20 in FIGS. 1 and 5.

Upon the bottom of the hopper, defined by the plates 54 and 56, as shown at 53, is an outlet pipe 34, the same as above described. The primary purpose of the illustration of FIGS. 9, 10 and 11 is to indicate that the present invention contemplates the formation of a hopper portion for the main body 18 of the tank truck, which hopper portion is defined so as to include the converging transversely arcuate plates 54 which may have any desired radius or other irregular, but arcuate shape.

Having described my invention, reference should now be had to the following claims.

I claim:

1. In a tank truck having a supporting framework on wheels, a closed tank body on said framework including a pair of downwardly and inwardly inclined opposing walls as sectors of substantially cylindrical form, and of substantially constant cross section throughout their length, with their lower edge portions cut and fixedly interconnected, defining end walls and lower side wall portions of said tank, and a longitudinally extending downwardly facing top wall element forming a sector of a substantially cylindrical form with its edges formed and in registry throughout its periphery with and secured to upper edge portions of said inclined walls defining top and upper side wall portions of said tank.

2. In a hopper type tank truck having a supporting framework on wheels, a closed tank body on said framework including a pair of downwardly and inwardly inclined opposing walls as sectors of substantially cylindrical forms and of substantially constant cross section throughout their lengths, with their lower edge portions fixedly interconnected defining end walls and side wall portions of said tank, their upper edges forming opposed substantially continuous curves high at their central portions and inclined downwardly and inwardly at their ends, and a longitudinally extending downwardly facing top wall element at its peripheral edges formed with its opposing end portions high and with its opposing side portions extending downwardly from opposite ends, and secured to upper edge portions of said inclined walls.

3. In a tank truck having a supporting framework on wheels, a closed tank body on said framework including a pair of downwardly and inwardly inclined opposing walls of an arcuate substantially uniform cross sectional shape throughout their length, with their lower edge portions cut and fixedly interconnected, defining end walls and lower side wall portions of said tank, and a longitudinally extending downwardly facing top wall element of an arcuate cross sectional shape throughout its length with its edges formed and in registry throughout its periphery with and secured to upper edge portions of said inclined walls, defining top and upper side wall portions of said tank.

4. In a hopper type tank truck having a supporting framework on wheels, a closed tank body on said framework including a pair of downwardly and inwardly inclined opposing transversely arcuate walls of uniform cross section throughout their length with their lower edge portions fixedly interconnected defining end walls and side wall portions of said tank, their upper edges forming opposed substantially continuous curves high at their central portions and inclined downwardly and inwardly at their ends, and a longitudinally extending downwardly facing top wall element with its opposing end portions high and with its opposing side portions extending downwardly from opposite ends, and at its peripheral edges formed and secured to upper edge portions of said inclined walls.

5. In a tank truck having a framework on wheels, a closed tank body on said framework with its bounding walls formed as irregular sectors forming a part of substantially cylindrical forms of substantially the same radius, said body including a pair of longitudinally opposed downwardly and inwardly inclined walls of general cylindrical form with their inner registering end edges joined and secured together, their upper edges forming opposed substantially continuous curves high at their central portions and inclined downwardly and inwardly at their ends, and a longitudinally extending downwardly facing top wall element overlying said pair of inclined walls of a generally cylindrical form formed throughout its periphery, generally conforming in plan to an ellipse, with its opposing end portions high and with its opposing side portions extending downwardly from opposite ends for registry throughout 360 degrees with the corresponding upper edge portions of said inclined walls and fixedly secured thereto.

6. In a tank truck having a supporting framework on wheels, a closed tank body on said framework including a pair of longitudinally aligned hoppers, each hopper having a pair of downwardly and inwardly inclined opposing walls of a shape corresponding to a sector of substantially cylindrical form with their opposing inner edges interconnected, the adjacent inner inclined walls of each hopper intersecting and secured together in a vertical plane below the upper ends of the corresponding outer inclined walls, and a longitudinally extending downwardly facing top wall element forming a sector of a substantially cylindrical form with its peripheral edges defining substantially an ellipse in plan, said peripheral edges being cut throughout 360 degrees, high at the ends thereof with intermediate portions extending downwardly and in registry with and fixedly secured to corresponding upper edge portions of the inclined walls forming part of said hoppers.

7. In the tank truck of claim 6, the downwardly extending walls being transversely arcuate with their longitudinal central axes extending at acute angles to the horizontal, said hoppers on their interiors being in communicating relation.

8. In the tank truck of claim 6, bottom portions of the downwardly and inwardly inclined walls of each hopper being cut away, and a hollow bottom plate of generally conical shape formed to conform with the bottom portions of said inclined walls and peripherally secured thereto throughout 360 degrees, and an outlet pipe joined to and extending laterally from the bottom portion of said bottom plate.

References Cited in the file of this patent

UNITED STATES PATENTS

| D. 170,969 | Clough | Dec. 1, 1953 |
| 1,915,757 | Pierce | June 27, 1933 |
| 1,956,310 | Boyd | Apr. 24, 1934 |
| 2,273,601 | Thomas | Feb. 17, 1942 |
| 2,616,758 | Meyers | Nov. 4, 1952 |

FOREIGN PATENTS

| 530,303 | Belgium | July 31, 1954 |
| 813,425 | Great Britain | May 13, 1959 |
| 526,245 | Italy | May 16, 1955 |
| 545,401 | Italy | July 2, 1956 |